United States Patent [19]

Maserang et al.

[11] 4,023,299

[45] May 17, 1977

[54] FISHING LINE CUTTER

[76] Inventors: Robert E. Maserang, 1207 Monterrey Blvd., Apt. 210, Euless, Tex. 76039; Norman L. Fitzjarrald, 5305 Richland Court, Fort Worth, Tex. 76118

[22] Filed: Nov. 24, 1975

[21] Appl. No.: 634,918

[52] U.S. Cl. .................................... 43/25; 225/6
[51] Int. Cl.$^2$ .................................... A01K 89/00
[58] Field of Search ............... 43/25; 225/6, 63, 64

[56] References Cited

UNITED STATES PATENTS

| | | | |
|---|---|---|---|
| 594,989 | 12/1897 | Finn | 225/64 X |
| 940,228 | 11/1909 | Benda | 225/64 |
| 1,469,649 | 10/1923 | Sinkula et al. | 43/25 X |

Primary Examiner—Louis G. Mancene
Assistant Examiner—Daniel J. Leach
Attorney, Agent, or Firm—Arthur F. Zobal

[57] ABSTRACT

A device for attachment to a fishing reel for cutting fishing line is disclosed. The device comprises a flat portion adapted to engage the flat side of the reel; an arcuate portion adapted to engage the round edge or surface of the reel next to its flat side; and a slotted portion having a slot formed therein for cutting fishing line.

3 Claims, 5 Drawing Figures

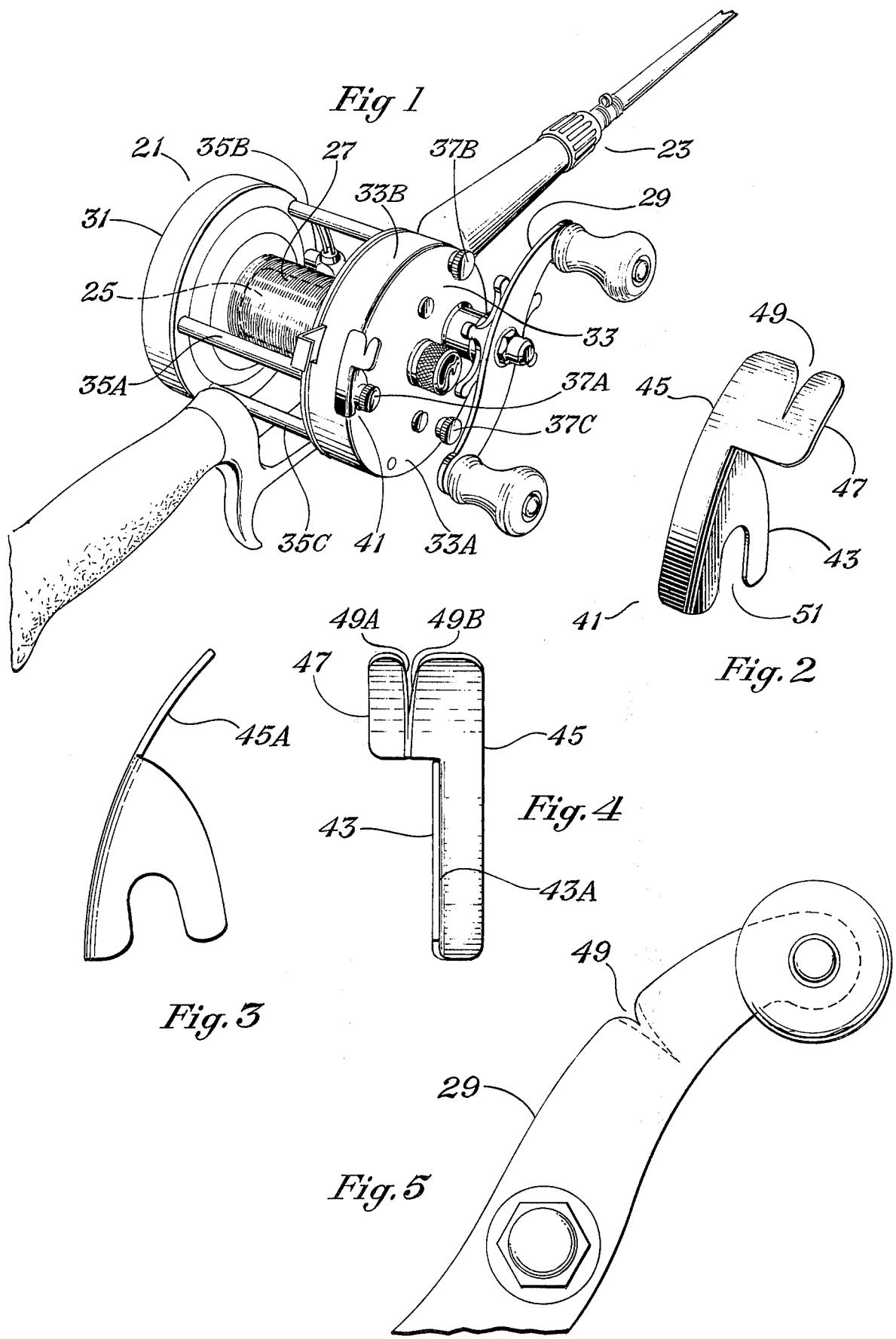

FISHING LINE CUTTER

SUMMARY OF THE INVENTION:

This invention relates to an improvement for a fishing reel for cutting fishing line to facilitate changing fishing lines, attaching hooks, leaders, etc.

In the preferred embodiment the improvement comprises a device adapted to be attached to the fishing reel and having a slot for cutting the fishing line. In another embodiment a slot is formed in structure which forms part of the reel.

The device of the preferred embodiment comprises a flat portion adapted to engage the flat side of the reel, an arcuate shaped portion extending to one side of said flat portion and adapted to fit partially around the surface or edge of the fishing reel, and a slotted portion extending to the opposite side of the flat portion. The slotted portion has a slot formed therein with sharp edges for cutting the fishing line. The flat portion has an opening for receiving an attaching member for attaching the device to a reel with its flat side engaging the flat side of the reel and its arcuate portion engaging the round surface or edge of the reel.

BRIEF DESCRIPTION OF THE DRAWINGS:

FIG. 1 illustrates the device of the present invention attached to a fishing reel;

FIG. 2 is an enlarged perspective view of the device of the present invention;

FIG. 3 is an outside side view of the device of FIG. 2;

FIG. 4 is an underside view of the device of FIG. 2; and

FIG. 5 is a modification of the present invention.

DETAILED DESCRIPTION OF THE INVENTION

Referring now to FIG. 1, there is illustrated a conventional reel 21 shown attached to a fishing rod 23. For purposes of clarity the structure attaching the reel to the rod is not shown. The reel has a rotatable spool 25 illustrated in dotted lines, around which the fishing line 27 is wound. A handle 29 is employed for rotating the spool for winding the line thereon. The spool is supported for rotation between two cylindrical ends 31 and 33 which are held together by cross-rods 35A, 35B and 35C. Threaded members 37A, 37B and 37C are employed for securing the two ends 31 and 33 to the cross-rods 35A, 35B and 35C. These members can be unthreaded for disassembling the reel.

Referring also to FIGS. 2-4, the line cutting device is identified at 41. It comprises a flat portion 43 and an arcuate portion 45 extending to one side of the flat portion 43. The back side 43A of the flat portion 43 is adapted to engage the flat side 33A of the cylindrical end 33 while the underside 45A of the arcuate portion 45 is adapted to engage the round surface or edge 33B of the cylindrical end 33 of the reel. A slotted portion 47 extends from the opposite side of the flat portion 43. The slotted portion 47 has a V-shaped slot 49 formed in its front edge for cutting fishing line. As seen in FIG. 4, the edges 49A and 49B of the V-shaped slot 49 are sharpened on the underside to facilitate cutting of the line. The lower end of the flattened portion 43 has a slot or opening 51 formed therethrough for receiving the shank of one of the threaded members 37A, 38B or 37C for attaching the device to the reel. The device may be attached to the reel by unthreading one of the threaded members, preferably member 37A as seen in FIG. 1 and fitting the slot 51 around the shank of the threaded member 37A. The slot 51 is formed in the flat portion 43 at a position and has a dimension such that the underside 45A of the arcuate portion 45 will engage the rounded surface of the cylindrical end 33 when the slot 51 is fitted around the shank of the threaded member 37A. The threaded member 37A is then threaded inward to tightly secure the back side 43A of the flattened portion 43 against the flat side 33A of the cylindrical end 33 of the reel. When attached to the reel, the cutting slot 49 extends outward from the reel allowing a person to readily cut the fishing line by inserting the fishing line in the V-shaped slot and pulling backward. The exposed edges of the device 41 are all curved or rounded to prevent injury to the user.

Thus, as can be understood, the device of the present invention may be readily attached to a conventional fishing reel without modification thereof. When attached, it will be attached to a stationery part of the reel thereby facilitating cutting and is convenient and out of the way of the operator. In addition, it is easy to use for cutting fishing line; it is safe since it has no sharp exposed points; and is economical.

In the embodiment of FIG. 5, the V-shaped cutting slot 49 is formed in the edge of the handle 29. If the handle is of the type that will rotate only in one direction, the slot preferably will be formed in the edge of the handle such that when the line is inserted in the slot and pulled backward, the handle will not rotate thereby providing a stable base for facilitating cutting of the line.

We claim:

1. A fishing reel for use on a fishing rod for reeling in and unreelng fishing line, said reel comprising:
   a rotatable spool around which a fishing line may be wound and unwound,
   a handle for rotating said spool; and
   a slot formed in said handle and having sharp edges for cutting fishing line.

2. A device for attachment to a fishing reel for cutting fishing line, comprising:
   a first portion adapted to engage said reel,
   a slotted portion extending from said first portion,
   said slotted portion having a slot formed therein with sharp edges for cutting fishing line, and
   means for attaching said device to said reel with said first portion engaging said reel and said slotted portion extending away from said reel.

3. A device for attachment to a fishing reel for cutting fishing line, said reel being of the type having a generally round surface at one end joining a flat side extending in a plane perpendicular to the axis of said reel, said device comprising:
   a flat portion adapted to engage said flat side of said reel,
   an arcuate portion extending to one side of said flat portion and adapted to fit partially around said generally round surface of said reel,
   a slotted portion extending to the opposite side of said flat portion,
   said slotted portion having a slot formed therein with sharp edges for cutting fishing line,
   said flat portion having an opening for receiving an attaching member for attaching said device to a reel with its side engaging the flat side of the reel and its arcuate portion engaging the generally round surface of said reel.

* * * * *